United States Patent [19]

Allen et al.

[11] Patent Number: 5,047,695

[45] Date of Patent: Sep. 10, 1991

[54] DIRECT CURRENT (DC) ACOUSTIC OPERATION OF XENON-METAL HALIDE LAMPS USING HIGH-FREQUENCY RIPPLE

[75] Inventors: Gary R. Allen, Chesterland; Joseph M. Allison, Euclid; John M. Davenport, Lyndhurst; Richard L. Hansler, Pepper Pike, all of Ohio

[73] Assignee: General Electric Company, Schenectady, N.Y.

[21] Appl. No.: 482,387

[22] Filed: Feb. 20, 1990

[51] Int. Cl.$^5$ .................. H04B 41/00; H04B 37/00
[52] U.S. Cl. .................................. 315/291; 315/82; 315/175; 315/224; 315/DIG. 7
[58] Field of Search ............... 315/291, 82, 171, 172, 315/176, 224, 287, 248, 358, DIG. 7

[56] References Cited

U.S. PATENT DOCUMENTS

| | | | |
|---|---|---|---|
| 3,746,920 | 7/1973 | Flatley | 315/170 |
| 4,117,453 | 9/1978 | Hodgson et al. | 340/76 |
| 4,749,913 | 6/1988 | Stuermer et al. | 315/DIG. 7 |
| 4,904,907 | 2/1990 | Allison et al. | 315/307 |

Primary Examiner—Eugene R. Laroche
Assistant Examiner—Son Dinh
Attorney, Agent, or Firm—George E. Hawranko; Stanley C. Corwin; John P. McMahon

[57] ABSTRACT

A method and a ballast circuit are disclosed for operating a xenon-metal halide lamp particularly suited for automotive applications with a direct curernt (DC) levels having selectable amount of ripple imposed thereon. The ripple provides for acoustically straightening the arc between the electrodes of the xenon-metal halide lamp. The DC acoustic operation has the capability of utilizing cataphoresis effect so as to provide a less distracting forward beam illumination for a vehicle.

17 Claims, 8 Drawing Sheets

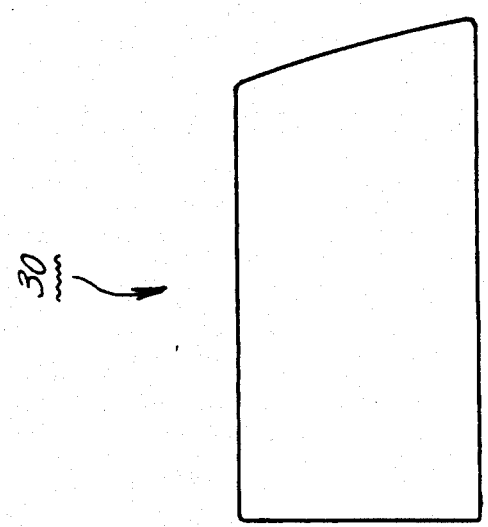
Fig. 7(b)
Fig. 7
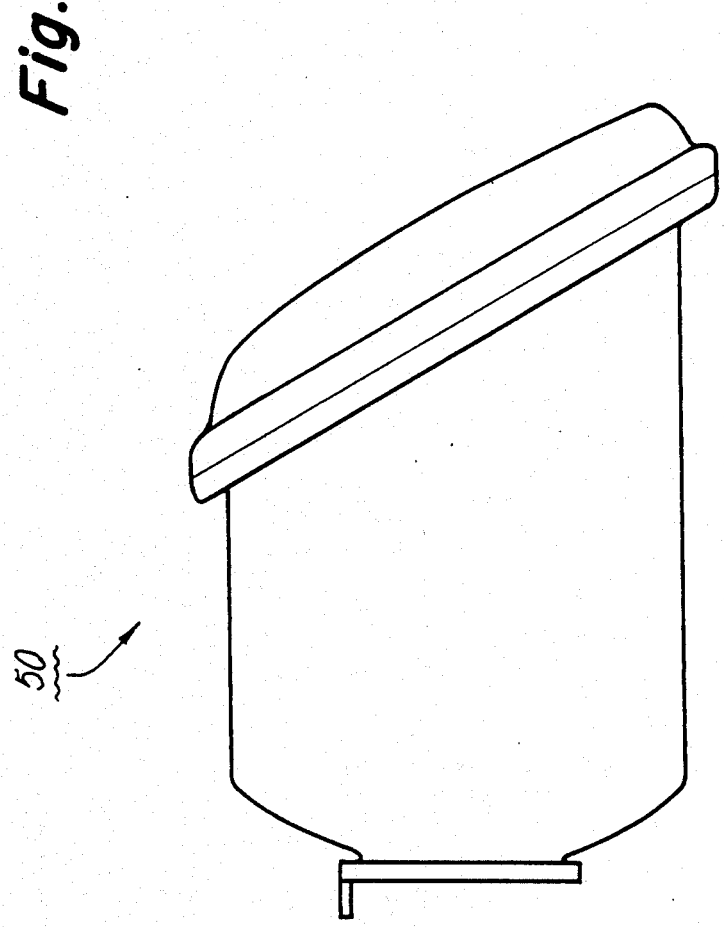
Fig. 7(a)

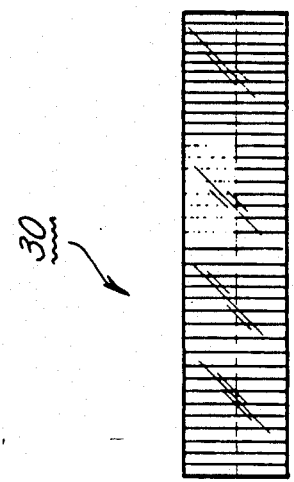
Fig. 8(b)
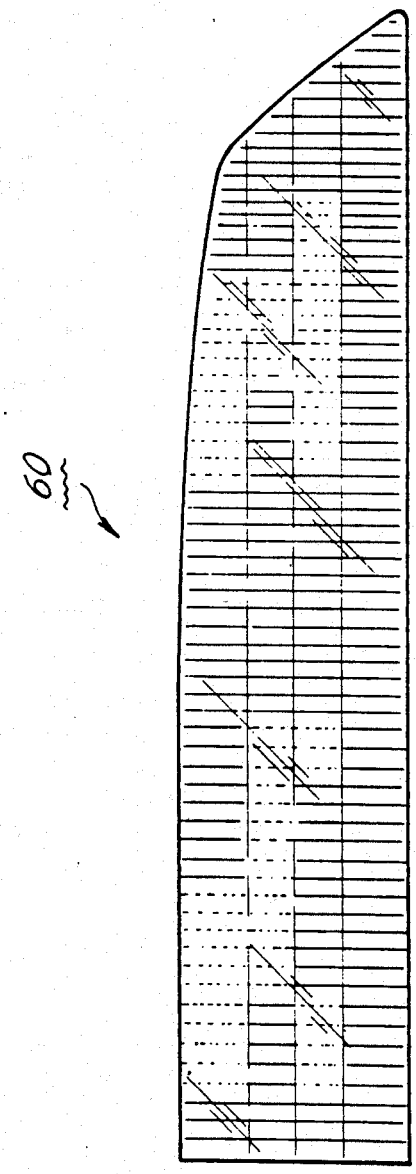
Fig. 8
Fig. 8(a)

DIRECT CURRENT (DC) ACOUSTIC OPERATION OF XENON-METAL HALIDE LAMPS USING HIGH-FREQUENCY RIPPLE

BACKGROUND OF THE INVENTION

This invention relates to a method and an operating circuit both for xenon-metal halide lamps. More particularly, the invention relates to a method and an operating circuit that provide for direct current signals having a ripple imposed thereon for acoustically operating a xenon-metal halide lamp containing a high pressure of xenon that yields a light source which is particularly suited for automotive applications.

U.S. patent application Ser. No. 157,436 filed Feb. 18, 1988 of R. S. Bergman et al., assigned to the same assignee as the present invention and herein incorporated by reference, discloses a xenon-metal halide lamp particularly suited for automotive applications. The xenon-metal halide lamp provides improved efficiency and longer life relative to incandescent lamps while a high pressure of xenon gas primarily achieves instant light capabilities making such a lamp particularly suited for automotive applications.

U.S. patent application Ser. No. 320,736 filed Mar. 8, 1989 of G. R. Allen et al., assigned to the same assignee as the present invention, and herein incorporated by reference, discloses an AC ballast circuit for acoustically operating xenon-metal halide lamps to provide a straight arc condition between the electrodes of the xenon-metal halide lamp. The straight arc provides for a point-like source that is beneficial for optical purposes and also prevents the arc from touching the walls of the lamp so as not to reduce the life of the lamp. Further, in a preferred embodiment, frequency modulation is incorporated to broaden the desired operational frequency bands that provide for the straight arc.

Although the AC ballast circuit and method of operating of Ser. No. 320,736 serves well the needs of the xenon-metal halide lamp, it is desired that the circuit complexity be reduced in order to correspondingly reduce the cost and size of the ballast circuit so as to allow the ballast circuit to be more easily integrated into the automotive housing. A reduction could be provided by allowing the ballast circuit to be directly connected to the DC source of excitation (battery) of the automobile and thereby eliminate the associated circuit components of the DC/AC converter.

As discussed in U.S. patent application Ser. No. 157,360 of R. L. Hansler et al., assigned to the same assignee as the present invention and herein incorporated by reference, lamps having a metal halide ingredient, that are operated from a DC source of excitation typically experience the effects of cataphoresis which cause the halides of a metal halide lamp to be moved or swept into the end regions of the lamp so as not to contribute to providing the desired illumination of such a lamp. This cataphoresis effect is particularly noticed when the light source is horizontally arranged such as in automotive applications. It is desired that means be provided to allow for xenon-metal halide lamps to be operated from a DC source without suffering the accompanying disadvantageous effects of cataphoresis typically encountered for such DC lamp operation. In addition, it is desired that such DC operation provide for a straighten arc between the electrodes of the xenon-metal halide lamp.

Accordingly, it is an object of the present invention to provide a circuit connected to a DC source for operation of a xenon-metal halide lamp.

It is a further object to provide a method of operating a xenon-metal halide lamp in a DC manner without the disadvantageous effects of cataphoresis while at the same time providing a straight arc between the electrodes of the xenon-metal halide lamp.

It is a further object of the present invention to provide for a DC circuit that allows for an overall reduction in size relative to AC ballast type circuits employed for xenon-metal halide lamps.

Still further, it is an object of the present invention to provide for improvements that enhance the illumination patterns yielded by xenon-metal halide lamps and made available for automotive applications.

SUMMARY OF THE INVENTION

The present invention is directed to a circuit and a method for DC operation of a high pressure xenon-metal halide lamp which are particularly suited for automotive applications.

The operating circuit comprises means for developing a first signal or pulse having a relatively high amplitude and a relatively short duration. The high voltage pulse signal acts as a signal for starting the lamps. The operating circuit further comprises means for developing and applying to the xenon-metal halide lamp a first signal or direct current level having a relatively low value, means for developing a first ripple signal having a first range of selectable amplitudes and a first range of selectable frequencies, and means for combining the first DC level signal and the first ripple signal into a run or operate signal. The operating circuit further preferably comprises means for monitoring and terminating the voltage across the xenon-metal halide lamp if such reaches or falls below predetermined values selected for the run or start signals respectively.

The method comprises selecting the amplitude and frequency of the run signal such that the xenon-metal halide lamp is acoustically operated so as to provide a straightened arc between its electrodes. The method further comprises frequency modulating the signal applied to the lamp by a selectable amount so as to further increase the frequency range for acoustically operating the lamp. Still further, the method comprises the selection of the parameters of the run signal so that the xenon-metal halide lamp is provided with a weak cataphoresis effect that yields a separated colored light for vehicle illumination patterns that is non-offensive to a viewer inside the vehicle.

BRIEF DESCRIPTION OF THE DRAWINGS

FIG. 7 consists of FIGS. 7(a) and 7(b) respectively illustrating a conventional halogen headlamp and the xenon-metal halide headlamp related to the present invention.

FIG. 8 consists of FIGS. 8(a) and 8(b) respectively illustrating a dual beam conventional headlamp and a dual beam headlamp related to the present invention.

DETAILED DESCRIPTION

Figure 1:
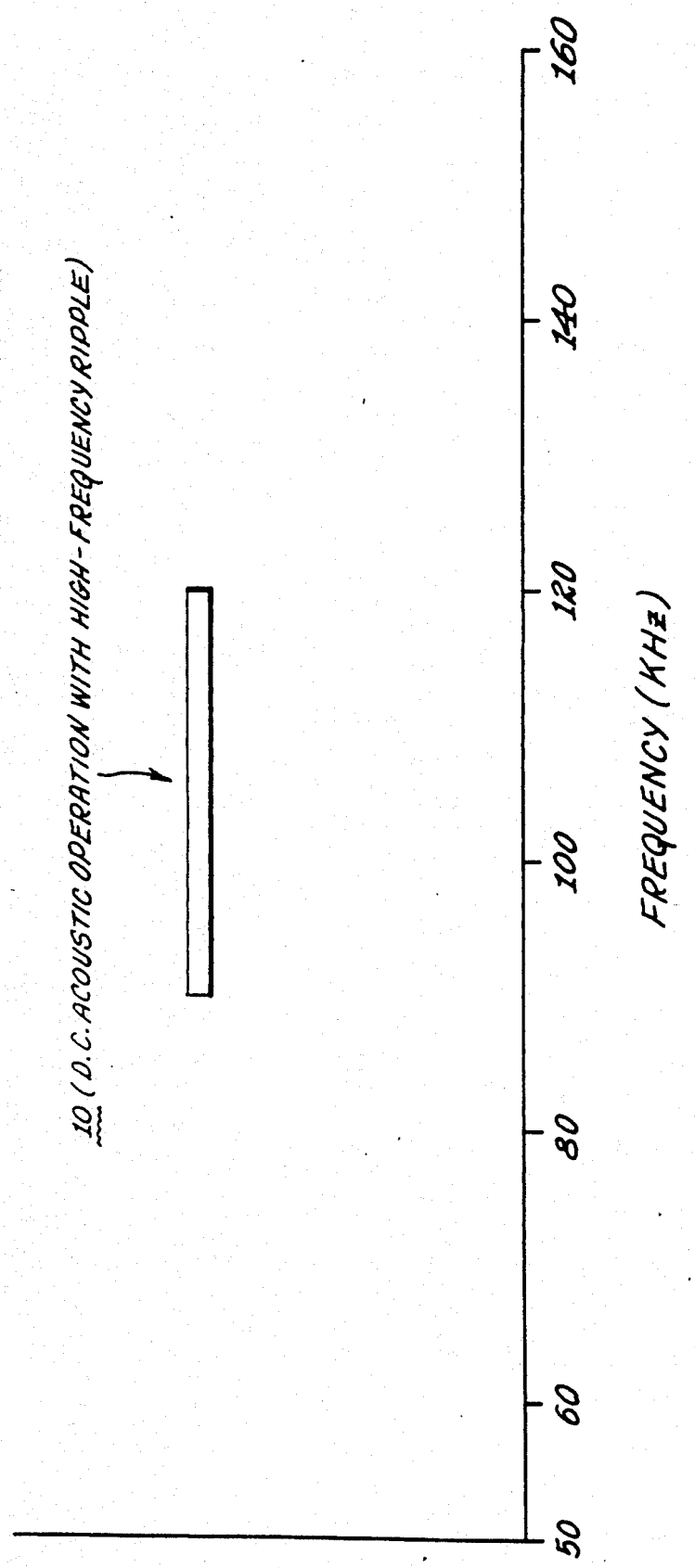
FIG. 1 is an illustration of the frequency bands related to the DC acoustic operation of xenon-metal halide lamps using high-frequency ripple.

Xenon-Metal Halide Lamp Characteristics Related To The Present Invention

The practice of the present invention is particularly suited for a xenon-metal halide lamp serving as a light source for automotive vehicle applications. As described in the previously mentioned U.S. patent application Ser. No. 157,436, the xenon-metal halide light source having a relatively long anticipated life of about 5000 hours not only provides for instant light to serve the illumination needs of the automobile, but also because of its reduced dimensions, relative to incandescent light sources, allows for a reduction in the hood lines of automobiles, thereby accommodating the aerodynamically styling desires of automotive designers.

The present invention provides a circuit arrangement and a method for operating xenon-metal halide lamps yielding similar benefits as the operation of the circuit and method described in the previously mentioned U.S. patent application Ser. No. 320,736. The present invention operates the xenon-metal halide lamp having a xenon fill pressure of about 7 atmospheres, so as to yield an instant light output of at least 15000 lumens which amount is particularly suited for and more than meets the needs of automotive or vehicle lighting applications. The xenon-metal halide lamp operation results in a related hot-spot temperature below a critical value of 1000° C. and has a wall loading of approximately 20 watts per square centimeter yielding an efficacy of about 70 lumens per watt (LPW).

The xenon-metal halide lamp related to the present invention comprises an envelope having a bulbous portion with a volume between about 0.05 to about 1.0 cubic centimeters. The lamp may have a fill within its bulbous portion comprising a xenon gas having a cold pressure in the range of about 2 to about 15 atmospheres, mercury having an operating pressure in the range of about 2 to about 20 atmospheres and a metal halide compound of an amount in the range of about 1 to about 5 milligrams. Further, the envelope forming the lamp lodges a pair of electrodes respectively located at opposite ends and which are spaced apart from each other by a distance from about 1.5 to about 5 mm with the preferred amount being from about 2.0 to about 4.0 mm.

Preferred Method Of Operating High Pressure Xenon-Metal Halide Lamp

The preferred method of operating a high pressure xenon-metal halide lamp comprises applying a direct current (DC) excitation having various levels with each level having a selectable amplitude of ripple and a selectable frequency of ripple imposed thereon. The ripple may further be frequency modulated. The DC excitation is an electric current flowing in one direction only and is substantially constant in value. The run circuit takes effect after the xenon-metal halide lamp has been energized or started by means of a starting pulse having an amplitude from about 10 kilovolts to about 20 kilovolts and a duration of about 0.1 microsecond. The starting pulse and the run current are sequentially applied to the electrodes of the xenon-metal halide lamp. The run current has a ripple imposed thereon which is preferably modulated in the range of about ±5% to about ±20% of the center frequency of the ripple signal which is preferably about 100 kHz. The lamp is preferably operated with a warm-up current which is in the range from about 2 to 20 times the operating or run current to be described hereinafter with regard to FIG. 2. The method related to the present invention may be further described with reference to FIG. 1.

FIG. 1 illustrates DC acoustic operation 10 of xenon-metal halide lamps using high-frequency ripple. FIG. 1 has an X coordinate, given in kilohertz, in the range of 50 to 160 and is representative of a frequency of the ripple signal imposed on the second DC level or run signal that is applied to the high pressure xenon-metal halide lamp. The DC acoustic operation 10 is representative of the frequencies of the ripple signals for which the arc of the xenon-metal halide lamp is stable. The frequencies not encompassed 10 are representative of the frequencies for which the arc operates in an unstable manner. The stable operation includes the effect of utilizing frequency modulation related to the present invention.

The DC acoustic operation 10 of the present invention is different than the AC acoustic operation described in U.S. patent application Ser. No. 320,736 in that the waveform of the current of the present invention that is applied to the xenon-metal halide lamp does not change signs or polarities so that there is no inherent modulation of the lamp power such as that accomplished by the circuit and method of U.S. patent application Ser. No. 320,736. The DC acoustic operation 10 of the present invention is somewhat similar to one aspect of U.S. patent application Ser. No. 320,736 in that the frequency of the ripple applied to the run signal of the present invention is approximately twice the frequency of the modulation disclosed in Ser. No. 320,736 that provides acoustically straightening of the arc of the high pressure xenon-metal halide lamp.

In a manner similar to that described in Ser. No. 320,736, we have discovered that the DC acoustic operation 10, of the xenon-metal halide lamp significantly reduces the gravity-induced convection ordinarily encountered with such xenon-metal halide lamps having a xenon fill pressure in excess of two (2) atmospheres. The effect of the operation shown in FIG. 1 is to acoustically operate the xenon-metal halide lamp in such a manner that the upper wall temperatures of the related lamps are reduced by about 200° C. relative to non-acoustic operation, while at the same time the gravity-induced convection of the arc toward the electrodes is substantially reduced even to the point of arc straightening conditions. The arc straightening is primarily achieved due to the dominance of the acoustic motion of the xenon and mercury over the gravity-induced vertical convection of the xenon and mercury which otherwise would bend the arc between the electrodes in an upward manner. The frequency window of the stable, straightened arc in the operation 10 corresponds to the presence of acoustic perturbations of the gas which symmetrically force the arc to the center of the arc tube, rather than asymmetrically toward the wall of the arc tube.

Figure 2:
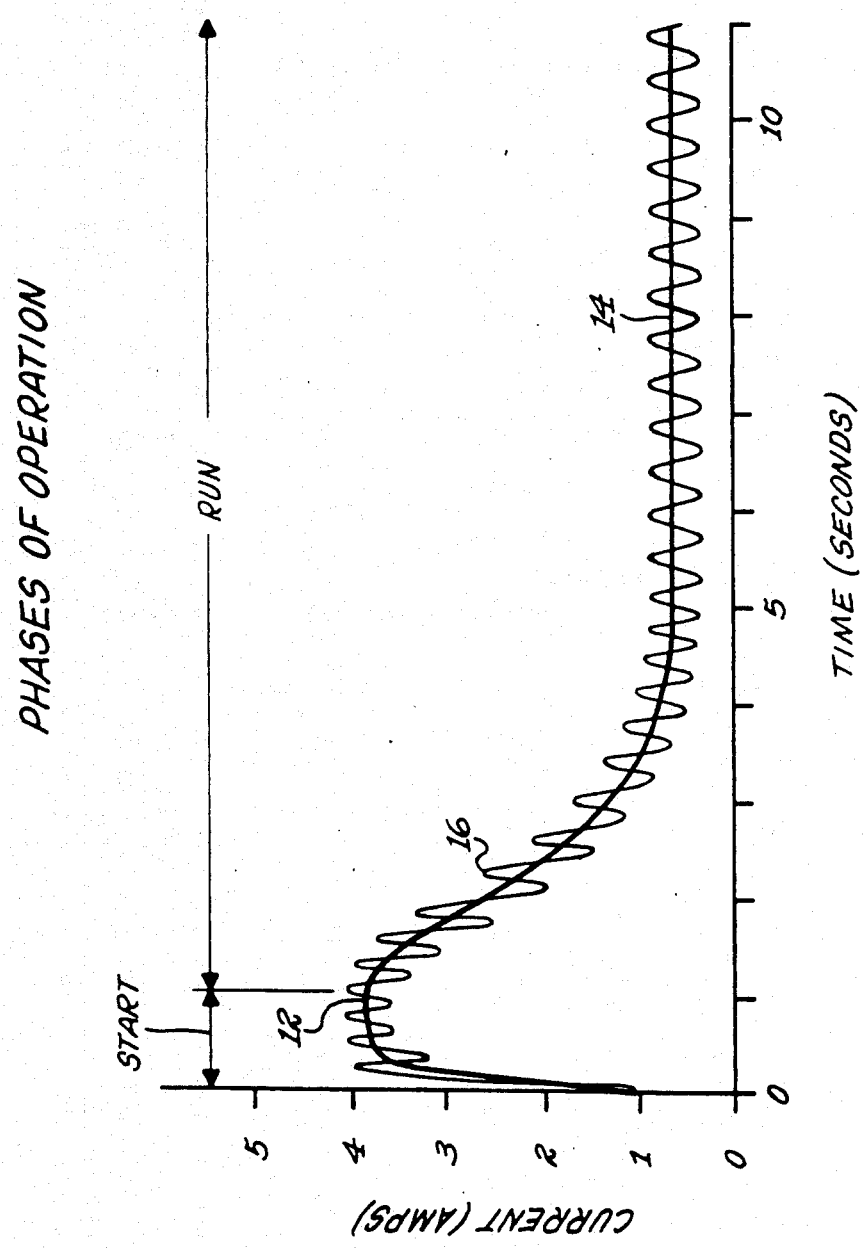
FIG. 2 illustrates the DC levels having various ripple signals imposed thereon during phases of operation of the xenon-metal halide lamp related to the present invention.

In addition to providing the straight arc of the xenon-metal halide lamp, the DC acoustic operation 10 reduces the amount of flicker during warm-up and broadens the frequency window for straight and stable operation relative to AC acoustic operation to provide a stable headlamp illumination pattern. Such a reduction may be described with reference to FIG. 2 which illustrates a current waveform of current 12 consisting of segments 12 and 14 corresponding to the start and run signal respectively with each such segment having imposed thereon ripple signal 16. FIG. 2 has an X coordinate (time), given in seconds, related to the phases of operation of the xenon-metal halide lamp, and a Y coordinate (current), given in amperes, which is applied across the electrodes of the xenon-metal halide lamp. The phases of operation illustrated in FIG. 2 consist of; (1) a start phase related to signal 12 and ripple signal 16 and (2) a run phase related to signal 14 and a ripple signal 16. The ripple level of the signal 16 is selected in accordance with the following expression:

$$\text{Ripple level} = \frac{\text{maximum current} - \text{minimum current}}{2(\text{mean current})} \quad (1)$$

For the run phase of operation of the xenon-metal halide lamp corresponding to signal 14, we have found that ripple levels for signal 16 of at least 30% and preferably 60% are needed to provide significantly wide frequency band for straight and stable operation of the arc, for example, ±25% of the operating frequency. Further still, proper frequency modulation is desired along with the ripple to produce the wide stable operating bands along the lines described in the aforementioned U.S. patent application Ser. No. 320,736. For the circuit arrangement embodiment shown in FIGS. 3, 4, and 5, to be described hereinafter, the absolute ripple current level is roughly constant for both the starting voltage and run current, however the percentage ripple increases from warm-up to run. It should be recognized that other embodiments could be provided to impose various ripple levels separately on the start and run functions.

During the start phase, a lamp current of about 3 amperes is initially applied to the xenon-metal halide lamp primarily to ionize the xenon gas and provide instant light for the vehicle. This relatively high current, in and of itself, is capable of somewhat straightening the arc condition thereby reducing the need of advantageously imposing the ripple on the starting signal. This reduction in ripple correspondingly reduces the flicker in the headlamp employing the xenon-metal halide lamp that may typically be involved during warm-up at higher ripple levels or with AC operation. The reduced ripple level during warm-up is advantageous because the acoustic resonance frequencies and the stable operation windows are shifting as the gas temperature warms up, and any applied frequency is necessarily destabilizing at some time during the warm-up. The ripple level is kept low enough in this embodiment to avoid unfavorable acoustic resonances during warm-up.

A further benefit related to the method of the present invention is to take advantage of the cataphoresis effects of the DC operation of the xenon-metal halide lamp. Normally in DC operation, the effect of cataphoresis drives the positive ions, associated with the discharge condition between the electrodes, to the cathode resulting in severe axial color separation and reduced efficacy due to removal of radiating metal atoms (e.g. sodium and scandium) from the arc. However, we have discovered that in the practice of the present invention, the xenon-metal halide lamp having a relatively short arc gap or spacing between electrodes of 2 mm and energized by the hereinbefore described DC acoustic operation does not manifest this severe separation problem. For such lamps, the metal halides within the fill are not completely separated out by the action of the DC cataphoresis so that even though there is some asymmetry in the axial distribution of the metal halides, the efficacy and desired color emission of the metal halide of the xenon-metal halide lamp are largely preserved and the lamp yield a homogeneous light.

Furthermore, we have discovered that in automotive applications, where the beam produced by the automotive headlamp is created by superposition of images related to the arc of the light source wherein half of which are reversed or mirror images of the other, the weak axial asymmetries remaining in the arc are cancelled out by the beam pattern. This occurrence is created, in part, by optics of the headlamp, for example, the reflector of the headlamp functioning to blend or merge all of the images of the light source into one beam pattern that is projected by the headlamp onto the road.

Still further, we have discovered that weak cataphoresis related to the present invention has a further beneficial effect in headlamp applications. The xenon-metal halide lamp may be operated with a slight cataphoresis effect so that color separation occurs wherein the light associated with a cool plume configuration located above the arc differs in color from the remaining white arc of the lamp. We have discovered, when such a color-separated arc condition is projected onto the road as a beam pattern, the colored plume appears as colored illuminator in the center foreground of the road in front of the car. In the present invention related to DC acoustic operation of the xenon-metal halide having the capability of weak cataphoresis, this colored light is less intense and appears to be off to the side of the road where it is less noticeable rather than concentrated on the center of the road. Such a beam illumination is less offensive to a viewer inside the vehicle.

DETAILED DESCRIPTION OF THE PREFERRED BALLAST EMBODIMENTS

Figure 3:
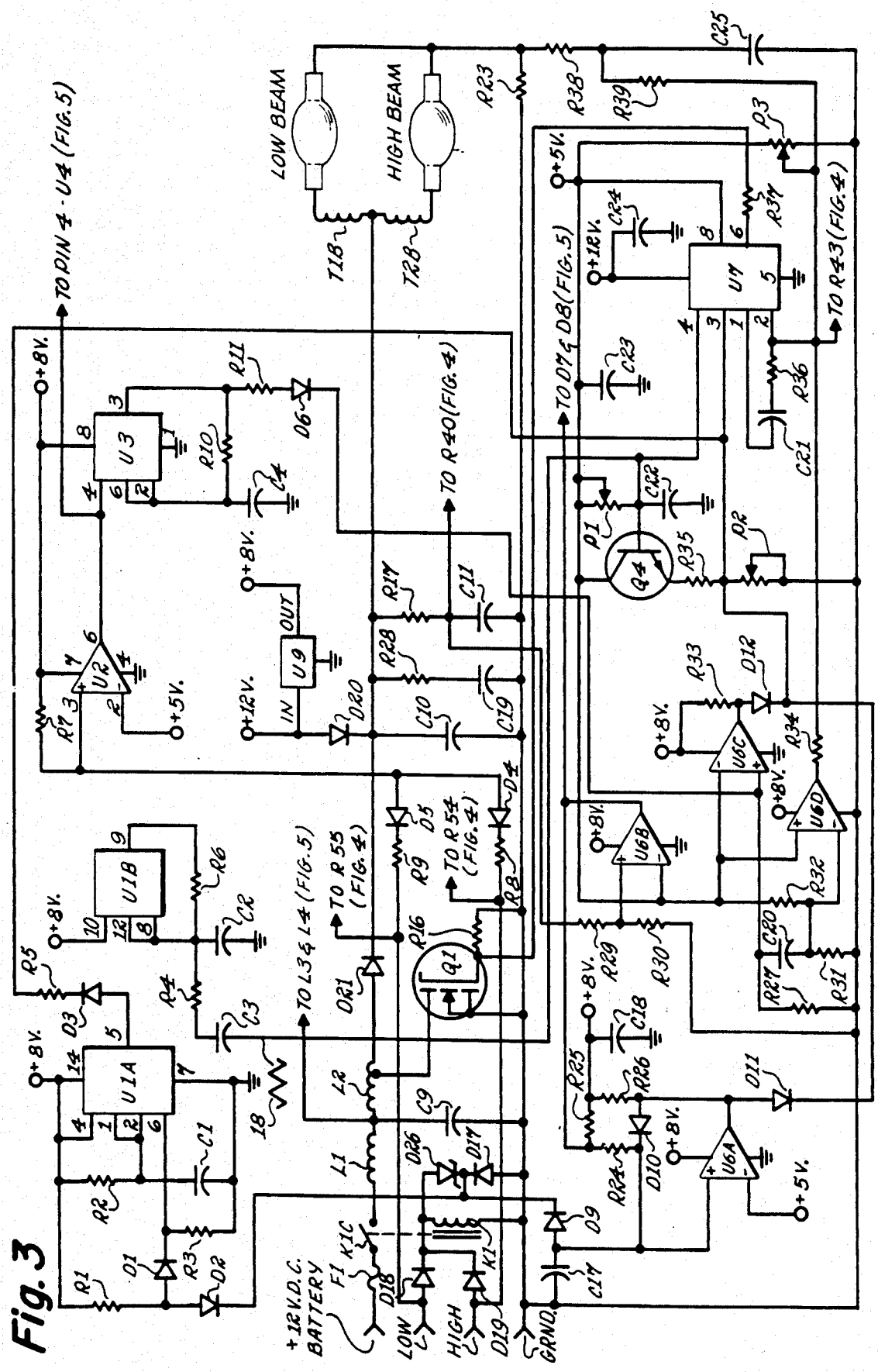
FIG. 3 is a schematic primarily illustrating the run converter of the present invention.
Figure 4:
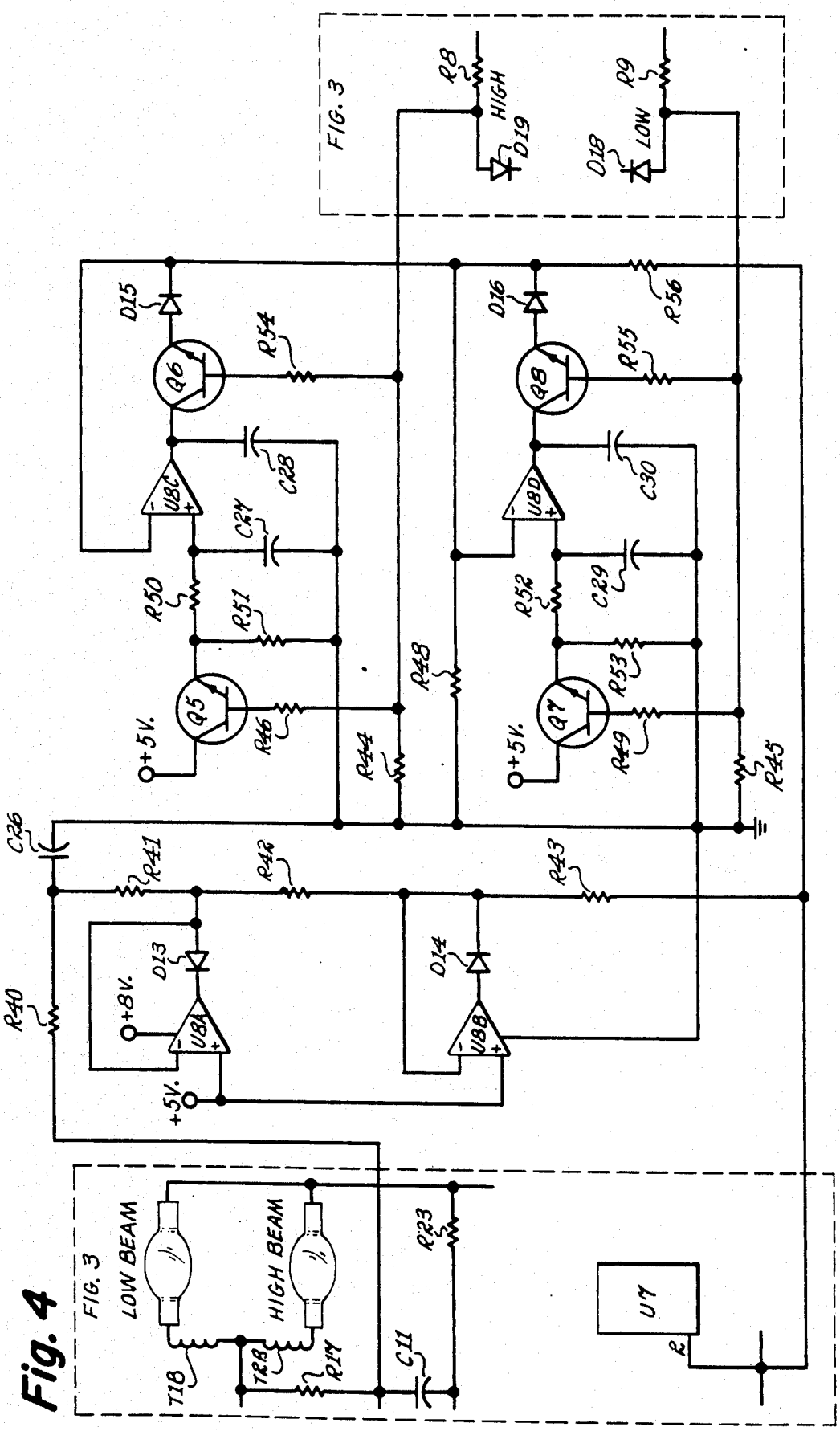
FIG. 4 is a schematic of the high and low warm-up timers related to the present invention.
Figure 5:
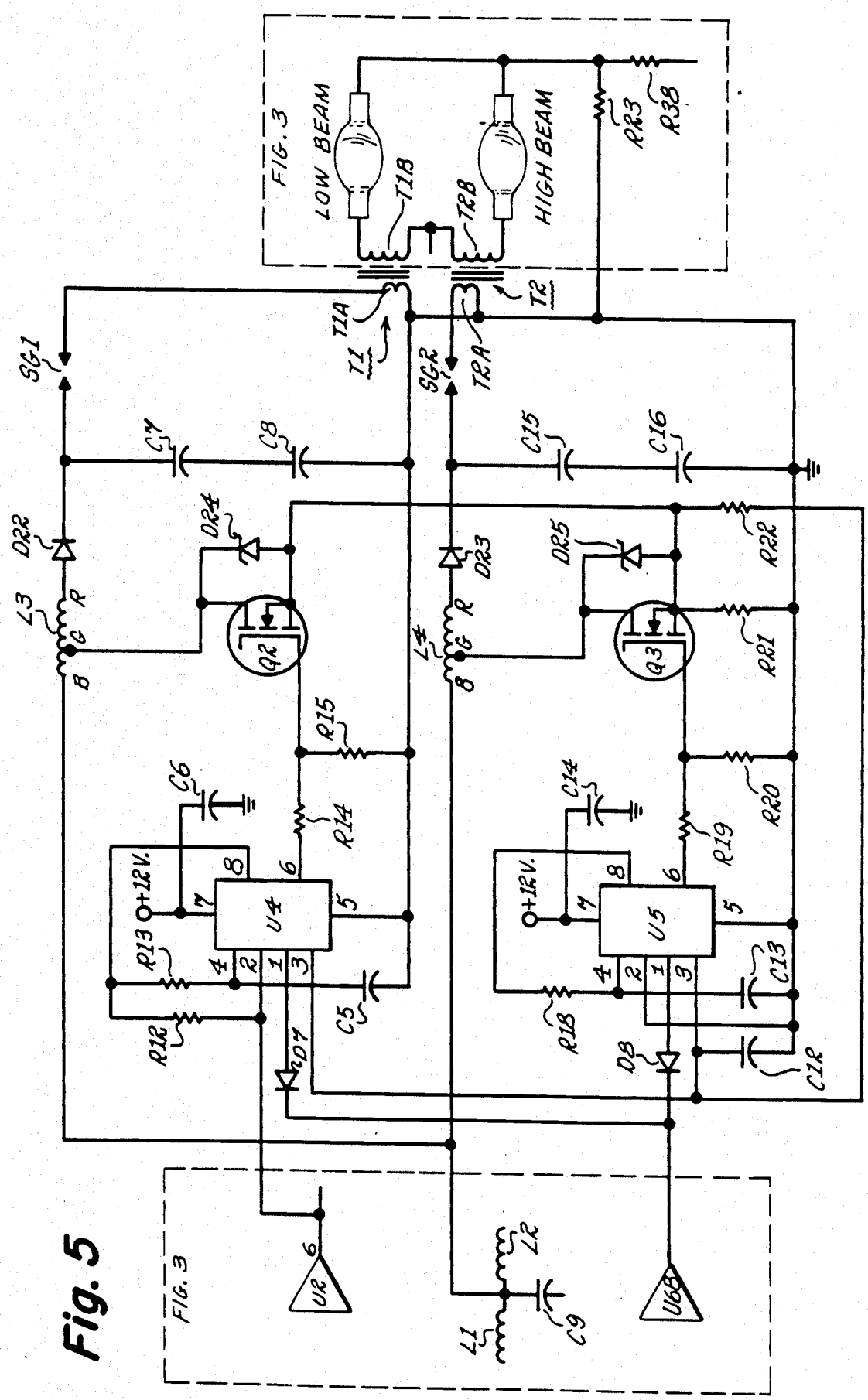
FIG. 5 is a schematic of the high and low starter circuits for operating the high pressure xenon-metal halide lamp.

A preferred embodiment of the present invention is schematically illustrated in FIGS. 3, 4 and 5 for an operating circuit related to first and second xenon-metal halide lamps respectively which provide the light source for the high and low beam illuminations of a vehicle. The embodiment of FIGS. 3, 4 and 5 are composed of various components of a typical value or of a type as designated in Table 1.

TABLE 1

| RESISTORS | | |
|---|---|---|
| R1 4.7K | R20 10K | R39 470 |
| R2 200K | R21 .13 2W | R40 50K |
| R3 22K | R22 1K | R41 50K |
| R4 68K | R23 .5 2W | R42 1K |
| R5 10K | R24 100K | R43 6.8K |
| R6 10K | R25 22K | R44 1.8K |
| R7 470K | R26 10K | R45 1.8K |
| R8 47K | R27 5.1K | R46 47K |
| R9 47K | R28 200K | R48 2.7K |
| R10 1M | R29 200K | R49 47K |
| R11 10K | R30 5.6K | R50 270K |

TABLE 1-continued

| | | |
|---|---|---|
| R12 10K | R31 1M | R51 4.7M |
| R13 12K | R32 47K | R52 270K |
| R14 10 | R33 10K | R53 4.7M |
| R15 10K | R34 1K | R54 47K |
| R16 10K | R35 1.8K | R55 47K |
| R17 120 2W | R36 1K | |
| R18 12K | R37 10 | |
| R19 10 | R38 470 | |

Note: All resistors are given in ohms and are ¼ watt unless otherwise specified.

CAPACITORS

| | |
|---|---|
| C1 .1 100 V | C16 .0068 |
| C2 .1 100 V | C17 4.7 25 V |
| C3 .1 100 V | C18 100 25 V |
| C4 .47 100 V | C19 .01 100 V |
| C5 .0082 100 V | C20 10 25 V |
| C6 .1 100 V | C21 .47 100 V |
| C7 .0068 2 KV | C22 .001 100 V |
| C8 .0068 2 KV | C23 .1 100 V |
| C9 470 35 V | C24 .1 100 V |
| C10 .1 200 V | C25 .47 25 V |
| C11 10 180 V | C26 4.7 25 V |
| C12 150 pF 100 V | C27 4.7 25 V |
| C13 .0082 100 V | C28 .01 100 V |
| C14 .1 100 V | C29 4.7 25 V |
| C15 .0068 2 KV | C30 .01 100 V |

Note: All capacitors are given in microfarads unless otherwise specified (pF - pico Farads).

POTENTIOMETERS

P1 20K ¼ W
P2 10K ¼ W
P3 10K ¼ W

DIODES

| | |
|---|---|
| D1 through D17: IN4148A | D22 20 V Diode |
| D18 HER 805 | D23 20 V Diode |
| D19 HER 805 | D24 150 V 5 W Zener |
| D20 HER 805 | D25 150 V 5 W Zener |
| D21 HER 805 | D26 150½ W Zener |

INTEGRATED CIRCUITS

U1 556 Signetics
U2 TL331 Texas Instruments
U3 555 Signetics
U4 UC3843 Unitrode
U5 UC3843 Unitrode
U6 LM339 National
U7 UC3843 Unitrode
U8 LM324 National
U9 MC78L08ACZ Motorola

TRANSISTORS

Q1 IRF 640
Q2 IRF 630
Q3 IRF 630
Q4 2N2222
Q5 2N2222
Q6 2N2222
Q7 2N2222
Q8 2N2222

INDUCTORS

L1 50
L2 50, 25% TAP
L3 50
L4 50

Note: L1, L3 and L4 are given in micro henries, whereas, L2 is given in millihenries.

In general, the circuit arrangement shown in FIGS. 3, 4 and 5 generates the starting voltage and run current along with the ripple signal all previously discussed with regard to FIGS. 1 and 2 so as to start and operate the xenon-metal halide lamps in a manner as disclosed hereinbefore. The circuit arrangement further provides for the means for developing the run signal of a DC direct current level having a relatively low value and which has imposed thereto the ripple signal having a range of selectable amplitudes and a range of selectable frequencies. The circuit arrangement further comprises means for generating the start signal having the ripple imposed thereon. The values of this starting voltage and run current along with respective ripple signals have been given hereinbefore. The starting voltage of about 20 KV having a duration of about 0.1 microseconds is applied across the xenon-metal halide lamp for a predetermined duration so as to cause the ionization of the ingredients in the lamp and thus the starting thereof.

The ballast circuit of FIGS. 3, 4 and 5 consists essentially of three separate dc-to-dc power converters: one to run and two for starting the individual (high and low beam) light sources. The ballast circuit operates to generate the start and run signals previously discussed with regard to FIG. 2 that provide instant light for each of the xenon-metal halide lamps shown in FIG. 3 as low beam and high beam. The initiation for activation of the low and high beam light sources is via a control signal (HIGH or LOW) from an external device such as that typically found in automobiles. The basic circuit topology for each of the three converters is that of the well-known boost converter. The use of separate starters for both the high and low beam light sources eliminates the need for high voltage switching while enabling the use of a single run converter for both of the light sources. The start converter delivers a 20 kv pulse superimposed on the output of the run converter. The run converter is active at all times following the application of battery power at either the "HIGH" or "LOW" input terminals shown at the input stage of FIG. 3. Application of power to either of these terminals also activates the associated starter by means of relay $K_1$, its contact $K_{1C}$, and inductor L1. As will be discussed hereinafter, the associated starter is shut down as soon as lamp current is established.

The run converter is a tapped inductor boost converter comprising power switching transistor, Q1; inductor, L2; diode, D21; capacitors, C9 and C10; and the pulse width modulator (PWM) controller, U7. The run current, primarily controlled by Q1 having its bias controlled by pulse width modulator U7, is applied to the lamps (high beam and low beam) via the path formed by D21 and T1B and T2B. The transformer winding T1B and T2B are essential to the start circuits to be discussed and form part of the run circuit. The inductance of these windings are desired to be small enough to allow rapid current build-up in the lamps and large enough to effectively couple the start pulse into the lamps. An inductance in the range 30 to 100 microhenry is desired. The selection of a relatively small output capacitor of the run circuit (C10 of FIG. 3) results in a high output ripple, essential to acoustic straightening of the arc, to be applied to the run current of the xenon-metal halide lamp.

The run converter is controlled, in part, by lamp current which is sampled by shunt resistor, R23 and fed back to the controller (U7 pin2) after being smoothed by the low pass filter, R38, R39, and C25. The average current applied to the lamp is controlled in a high gain closed loop. The reference for this loop is modified by the lamp voltage such that the lamp current decreases linearly with increasing lamp voltage provided this lamp voltage is within a predefined operating band or window to be described. In this manner, the lamp power (voltage times current) remains substantially constant with normal lamp voltage variations as well as with normal input voltage (D.C. battery) variations. If lamp voltage is outside the predetermined window, the reference for the high gain closed loop changes to produce a desired constant lamp current. Normally the reference remains constant except for a predefined warm-up time to be described.

The circuit that establishes the predetermined window is shown in FIG. 4 and comprises a pair of precision voltage clamps consisting of diodes, D13, D14 and the associated op-amps U8C and U8D (which are part of the quad amplifier, U8). Lamp voltage of either low or high beam, applied to the top or input to the series resistor string, R40, R41, R42, R43, via R23 and C11, results in a current through the string which is part of the high gain control loop reference used for the operation of the pulse width modulation U7 (pin2). This current is proportional to lamp voltage provided neither of the two precision clamps is active. The clamps are designed to activate at the upper and lower lamp operating voltage limits such as 40 to 50 volts. When lamp voltage is outside the limits established by these clamps, the reference for the control loop is independent of lamp voltage and provided by U8A or U8B. During this condition the lamp current is therefore held constant provided the warm-up timers have timed-out. There are two timers which are identical, one for the high beam and one for the low beam. The high beam timer consists of transistors, Q5 and Q6 along with an op-amp U8C that is a part of integrated circuit, U8. The low beam timer includes Q7, Q8 and an op-amp U8C which is also part of U8.

The purpose of the warm-up timers is to supply much higher than normal power to warm up the lamp quickly then taper off to the desired run power. The timer includes an important memory feature. When power, in the form of the run signal, is removed and reapplied to either of the light sources, the timer remembers how long its associated light source was off and adjusts the subsequent warm-up time accordingly. Without this feature, a consistent warm-up program of power control would be imposed on the lamp resulting in possible damage to the xenon-metal halide lamps from frequent short power interruptions.

In that both the warm-up timers are similar, the operation of high beam timer is only to be described. The application of battery power to the "HIGH" input terminal renders conductive or turns-on and saturates transistors, Q5 and Q6. Timing capacitor, C27 charges through R50 and Q5 from the regulated 5 volt source connection to Q5. The capacitor's (27) voltage is buffered by op-amp U8C and appears at the top end of resistor, R56 via R48. The current in R56 forms part of the control loop reference and is fed back to pin 2 of U7. The loop reference therefore changes with the voltage on the timing capacitor to produce a decreasing lamp current until the timing capacitor becomes fully charged. The timer imparts a certain desirable dwell at the beginning of the time cycle of the current applied to the lamp. Lamp power is held at maximum during the dwell time. The dwell is caused by the initial voltage at the inverting input of the op-amp U8C. This initial voltage holds the op-amp U8C in saturation (low output) until the timing capacitor has charged up to match the initial voltage. When power is removed from the lamp, the timing capacitor discharges through R50 and R51. If power to the lamp is reapplied before the capacitor completely discharges, the circuit will time-out faster than it would if the capacitor were allowed to fully discharge. The time during which high power is imposed on the lamp by the circuit depends on the amount of time that power is off. Shorter off-times result in shorter intervals of high power. The timer circuit design includes these above features so that circuit time constants are roughly matched to the thermal time constants of the lamp. The result is substantially constant light from the moment the switch is thrown from an external source to energize the xenon-metal halide lamp which yields instant light.

There are two starters both shown in FIG. 5: one for the high beam lamp and one for the low beam lamp. The high beam starter primarily includes integrated circuit, U5; transistor, Q3; inductor, L4; diode, D23; capacitors, C15 and C16; transformer, T2; and associated bias components. The low beam starter has identical components arranged around integrated circuit, U4 as shown in FIG. 5. In that both starters are identical only the operation of the high beam starter is to be described. The starter is an independent boost converter operating with current feedback only. Assuming that the starter is enabled, inductor, L4 injects pulses of current into capacitors, C15 and C16. The capacitors accumulate enough charge until their voltage rises to the breakdown potential of the spark gap SG1. The spark gap discharges the charge of the capacitors into the primary T2A of transformer, T2 and the transformer couples the resulting energy pulse into the lamp via the secondary winding T2B. This circuit action continues until the starter is automatically disabled after the lamp has started as to be described.

Comparator, U6B of FIG. 3, provides the enable/disable input to the related starter. This comparator senses the average lamp voltage via its + input and, when this voltage falls below a certain value for example 184 V, the starter is disabled via path D8 of FIG. 5. In a manner similar to that of U6B, comparator U6C of FIG. 3 provides a voltage limit function for the run converter. This comparator monitors the output voltage of the run converter via its + input and R29 and, when the voltage exceeds a certain value e.g., 200 v, outputs an inhibit command to the run converter via pin 3 of U7.

Comparator, U6D provides for an anti drop-out feature for the xenon-metal halide lamp. This comparator senses lamp voltage changes (not the voltage itself, but changes in the voltage). In the event of a sudden rise in lamp voltage, the comparator outputs a command to U7 via pin 2, which, in turn, is applied to pin 1 of U7 via R36 and C21 so as to increase the lamp current for a short time. A sudden increase in lamp voltage may be due to an undesired mechanical shock and this design feature of U6D advantageously keeps the lamp lit.

Comparator, U6A provides for automatic shut-down of the ballast in the event of a failed lamp. Timing components, C17 and R24 determine the maximum amount of time, for example, 0.5 seconds that either starter can operate before shutdown of ballast circuit of FIGS. 3, 4 and 5 may occur. The starters are inactivated via the path formed by D10, R24, and D7 and D8, whereas, the run circuit is inactivated via the path formed by D11, and pin 3 of U7. This feature reduces the probability of radio interference due to inoperative starting of the lamps.

A timer IC (U3) provides for a flash-to-pass feature related to the present invention. This IC is configured as a free-running oscillator with a period of 0.5 second. When both HIGH and LOW inputs are present (together) at the input stage of U2, the oscillator is enabled. The oscillator causes the lamp current to pulse to a higher value every half second via path D6, C20, U6D, R36, C21 and pin 1 of U7.

A minimum off-time feature related to the present invention is provided by integrated circuit, U1A (a timer configured as a one-shot). Anytime the input power, via the terminals LOW, HIGH of FIG. 3, is removed then quickly reapplied, U1A holds-off the operation of the run converter via the path formed by D3, R5 and pin 3 of U7, for 20 milliseconds. Without this feature, a rapid switch between the high and low lamps could result in the original lamp remaining on.

Integrated circuit, U1B (configured as an astable mv) provides for frequency modulation of the lamp current. The sawtooth output (signal 18 of FIG. 3) from this circuit feeds into the frequency determining input (pin 4) of the run converter's PWM controller U7 via the path formed by R4 and C3. The modulation frequency (the output frequency from U1B) is about 500 Hz.

For the embodiment shown in FIGS. 3, 4 and 5, the run current has (1) a frequency modulation of about 500 Hz, (2) a ripple frequency of about 100 kHz and (3) a ripple amplitude of about 50%. These quantities may be varied, adjusted or selected by (1) selecting the frequency modulation of U1B, (2) selecting a lower value of C9, such as, to increase the amplitude of ripple to a value of 60%, and (3) C10 so as to alter the frequency of the ripple signal.

Headlamps Yielded By The Practice Of The Present Invention

The DC ballast circuit disclosed with regard to FIGS. 3, 4 and 5 along with a reflector and the xenon-metal halide light source related to the present invention may be arranged into a single package and housed in a space that is smaller than that presently provided for conventional automotive headlamps. In the practice of the present invention, a DC ballast circuit mounted to the rear of dual headlamp reflectors is illustrated in one embodiment in FIG. 6.

Figure 6:
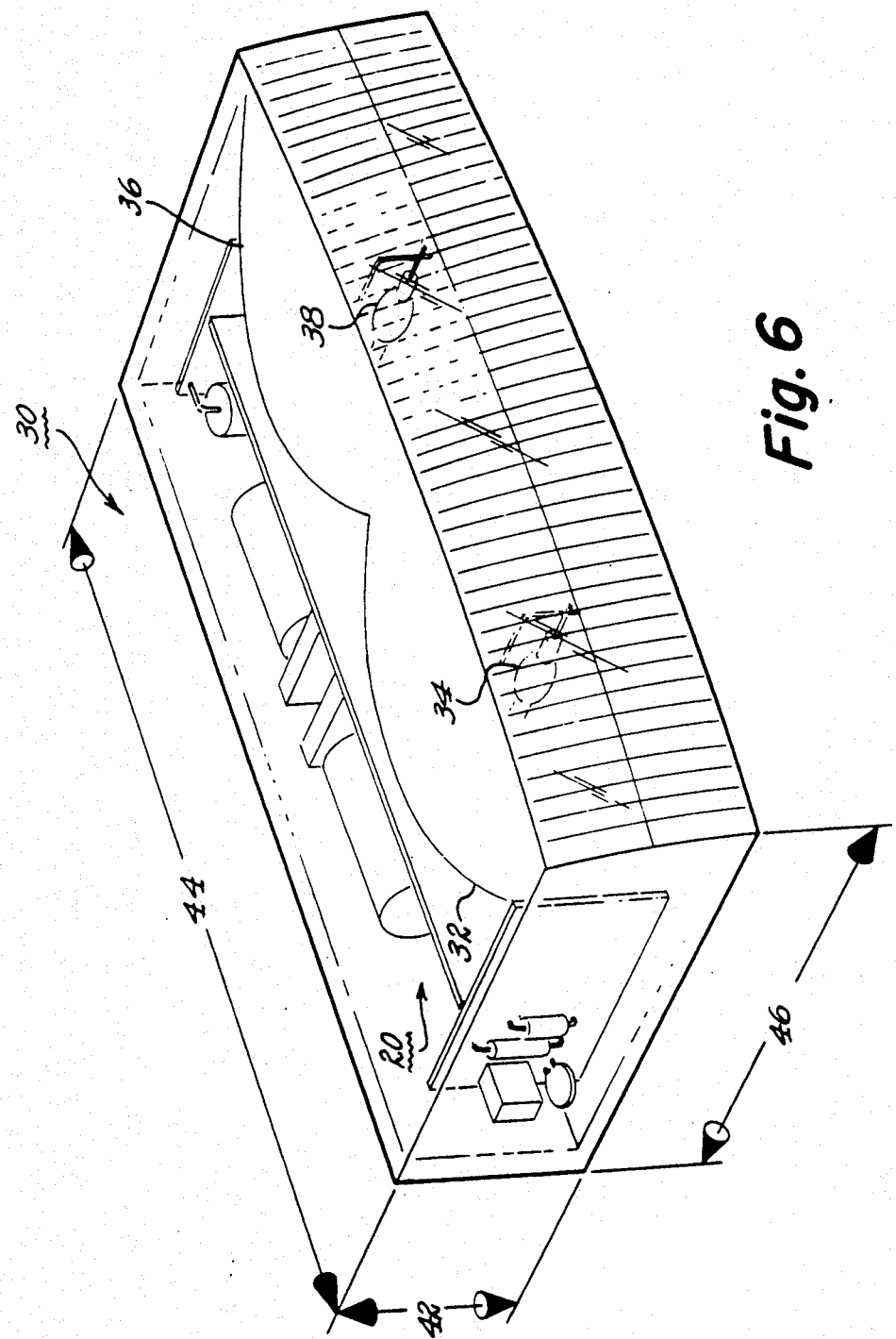
FIG. 6 illustrates a headlamp yielded by the present invention having a ballast incorporated within its packaging.

FIG. 6 illustrates a dual headlamp 30 having a first reflector 32 along with a xenon-metal halide lamp 34 related to a high beam illumination and a second reflector 36 along with a xenon-metal halide lamp 38 related to the lower beam illumination. The headlamp 30 has contained within its housing the ballast circuit 20 described with regard to FIGS. 3, 4 and 5. The ballast circuit is mounted on a circuit board 40 which occupies some of the area in the back of the high and low beam reflectors 32 and 36. The integrated automotive headlamp has a height 42 of about 50 mm, a width 44 of about 250 mm, and a depth 40 of about 100 mm.

The present headlamp represents a reduction in the overall dimensions relative a typical halogen headlamp 50 that provides both the high beam and low beam illumination and may be discussed with regard to FIG. 7 which is composed of FIGS. 7A and 7B respectively illustrating the conventional headlamp 50 and the headlamp 30 previously discussed with regard to FIG. 6. The headlamp 30 of the present invention relative to the conventional halogen headlamp 50 provides for an overall volume reduction of about 75%.

The reduction in the dimensions of the present invention relative to dual headlamp arrangement 60 may be further discussed with regard to FIG. 8 which is composed of FIGS. 8A and 8B respectively illustrating the dual headlamp 60 having a halogen light source and the headlamp 30 of the present invention discussed with regard to FIGS. 6 and 7B. A comparison from FIG. 8A to 8B reveals that the headlamp 30 of the present invention provides for a substantial reduction in the overall dimensions by at least a factor of 75%.

It should now be appreciated that the practice of the present invention allows for a substantial reduction in the overall dimensions of the headlamp employing a xenon-metal halide light source and having a DC acoustic operation.

It should be further appreciated that the DC acoustic operation of the present invention allows for a high pressure xenon-metal halide lamp to have a straighten arc and to be horizontally oriented while also being provided with instant light which is especially suited for automotive applications.

Further, the practice of the present invention allows for the DC operation of a xenon-metal halide lamp having a short arc gap that provides high efficiency and good color emissions. This short arc gap also provides for the utilization of weak cataphoresis effects which yields a desired beam pattern less annoying to an oncoming vehicle.

Although the D acoustic operation hereinbefore described is related to a xenon-metal halide lamp, the practice of this invention is equally applicable to all gas discharge lamp. The DC acoustic operation provides for a straightened arc between the electrodes of gas discharge lamps and yields the related benefits previously described.

Further, although two separate xenon-metal halide lamps have been described for generating the high and low beam illumination of a vehicle, a single metal halide lamp may be used to provide both high and low beam illumination along the lines as described in U.S. patent application Ser. No. 320,736.

Still further, although the previous description was related to a single ripple signal imposed on both the run signal and the start signal, it should be recognized that means may be provided to have separate ripple signals for the run and start signals. Further, if desired, the start signal may be provided that is devoid of any ripple signal and of any frequency modulation.

What we claim as new and desire to secure by Letters Patent of the United States is:

1. A method of operating a gas discharge light source having selected ingredients therein comprising the steps of:
   (A) applying across a pair of electrodes of said gas discharge light source a starting voltage having a relatively high amplitude and a relatively short duration;
   (B) continuing the application of said starting voltage until said discharge light source attains initial ionization;
   (C) applying across said pair of electrodes, a run current of a direct current (DC) type;
   (D) selecting a level and a center frequency for a ripple current signal; and
   (E) imposing said ripple current signal having such selected level and center frequency onto said DC run current.

2. A method according to claim 1 further comprising the step of,
   applying a frequency modulation signal onto said run signal.

3. A method according to claim 1 wherein said selected ingredients comprise:
   (A) a fill within said gaseous discharge including;

(A$_I$) a xenon gas having a cold pressure in the range of about 2 to about 15 atmosphere;

(A$_{II}$) mercury having an operating pressure in the range of about 2 to 20 atmospheres; and (A$_{III}$) a metal halide compound of an amount in the range of about 1 mg to about 5 mg.

4. A method according to claim 1 wherein;

(A) said starting signal is of an amplitude of an amount from about 10 kilovolts to about 20 kilovolts and of a duration of about 0.1 microseconds; and (B) said ripple current has a frequency which is modulated in the range of about ±5% to about ±20% of said center frequency which is about 100 kHz.

5. A method according to claim 1 further comprising a warm-up current which is in the range from about 2 to 20 times the operating or run current.

6. A method according to claim 1 wherein said electrodes are separated from each of other by an amount in the range from about 1.5 mm to abut 5 mm with the preferred amount being between 2.0 mm and 4.0 mm.

7. A ballast circuit responsive to control signal from external device for operating a gas discharge light source having selected ingredients therein comprising;

(A) means for generating and applying to said light source a start signal having a relatively high amplitude and a relatively short duration;

(B) means for continuing said application of said start signal until said light source has obtained initial ionization; and (C) means for developing and applying to said light source a run signal of a direct current type having imposed thereon a ripple signal having a selectable level and a selectable frequency.

8. A ballast circuit according to claim 7 further comprising;

means for developing and imposing on said run signal a frequency modulation signal.

9. A ballast circuit according to claim 7 further comprises;

(A) means for monitoring the presence of said start signal being applied to said light source and disabling the application of said start signal if a predetermined duration is exceeded.

10. A ballast circuit according to claim 7 further comprising;

means for monitoring and establishing an operating band for the voltages applied to said light source.

11. A ballast circuit according to claim 7 further comprising;

means for developing a relatively high current at the initial portion of said run signal after said light source has been initially and then quickly tapering down to a lower current.

12. A ballast circuit according to claim 7 further comprising;

means for timing the duration from the initial application of the run signal to the removal and then reapplication of said run signal, and in response to said duration, adjusting the level of power of said run signal.

13. A ballast circuit according to claim 7 further comprising;

means for monitoring the voltage across said light source in response to said start signal and disabling said start signal if its amplitude falls below a predetermined value.

14. A ballast circuit according to claim 7 further comprising;

means for monitoring the voltage across said light source to establish a predetermined range and if said range is exceeded the run current is held constant.

15. A ballast circuit according to claim 7 further comprising;

means for sensing rapid changes of voltage across said light source and in response thereto increasing the level of current of said run signal applied to said light source.

16. A ballast circuit according to claim 15 further comprising;

a second gas discharge light source; and means for sensing the presence of control signals from said external device requesting activation of both said first mentioned light source and said second light source and in response to said requested activation causing an increase in the level of current of said run signal applied to said light source.

17. A ballast circuit according to claim 7 further comprising;

means for sensing the rapid removal of said run signal from and reapplication to said light source and in response thereto delaying the development of said run signal by a predetermined amount.

* * * * *